(12) United States Patent
Brost et al.

(10) Patent No.: US 6,182,748 B1
(45) Date of Patent: Feb. 6, 2001

(54) PLATE HEAT EXCHANGER WITH SERPENTINE FLOW PATHS

(75) Inventors: Viktor Brost, Aichtal; Martin Kehr, Bad Urach/Wittlingen, both of (DE)

(73) Assignee: Modine Manufacturing Company, Racine, WI (US)

( * ) Notice: Under 35 U.S.C. 154(b), the term of this patent shall be extended for 0 days.

(21) Appl. No.: 09/235,085

(22) Filed: Jan. 21, 1999

(30) Foreign Application Priority Data

Jan. 21, 1998 (DE) .............................. 198 02 012

(51) Int. Cl.[7] ...................................... F28F 3/00
(52) U.S. Cl. ................. 165/167; 165/916; 123/196 AB; 123/41.33; 184/104.3
(58) Field of Search ................... 165/152, 153, 165/166, 167, 916, 902; 184/104.3; 123/196 AB, 41.33

(56) References Cited

U.S. PATENT DOCUMENTS

| | | | |
|---|---|---|---|
| 4,376,460 | * 3/1983 | Skoog | 165/167 |
| 4,669,532 | * 6/1987 | Tejima et al | 165/167 |
| 4,723,601 | * 2/1988 | Ohara et al. | 165/153 |
| 4,872,578 | * 10/1989 | Fuerschbach | 165/167 |
| 4,892,136 | * 1/1990 | Ichihara et al. | 165/167 |
| 4,900,328 | * 2/1990 | Breda et al. | 165/167 |
| 5,014,775 | * 5/1991 | Watanabe | 165/167 |
| 5,078,209 | * 1/1992 | Kerkman et al. | 165/167 |
| 5,125,453 | * 6/1992 | Bertrand et al. | 165/153 |
| 5,327,958 | * 7/1994 | Machata et al. | 165/167 |
| 5,464,056 | * 11/1995 | Tajima et al. | 165/167 |
| 5,511,612 | * 4/1996 | Tajima et al. | 165/167 |

* cited by examiner

*Primary Examiner*—Ira S. Lazarus
*Assistant Examiner*—Terrell McKinnon
(74) *Attorney, Agent, or Firm*—Wood, Phillips, VanSanten, Clark & Mortimer

(57) ABSTRACT

A plate heat exchanger includes a plurality of spaced plates secured together to form a stack having a plurality of fluid flow channels and a first plurality of passages. The channels are divided into at least first and second groups, the channels in the first group spaced from one another by the channels in second group. Each passage in the first plurality of passages extends between adjacent plates through one of the channels in the second group of channels. Each successive passage in the first plurality of passages is in fluid communication with successive channels in the first group of channels, and is offset from each preceding passage in the first plurality of passages such that fluid flowing through the first group of channels and the first plurality of passages follows a serpentine pattern through the stack.

10 Claims, 7 Drawing Sheets

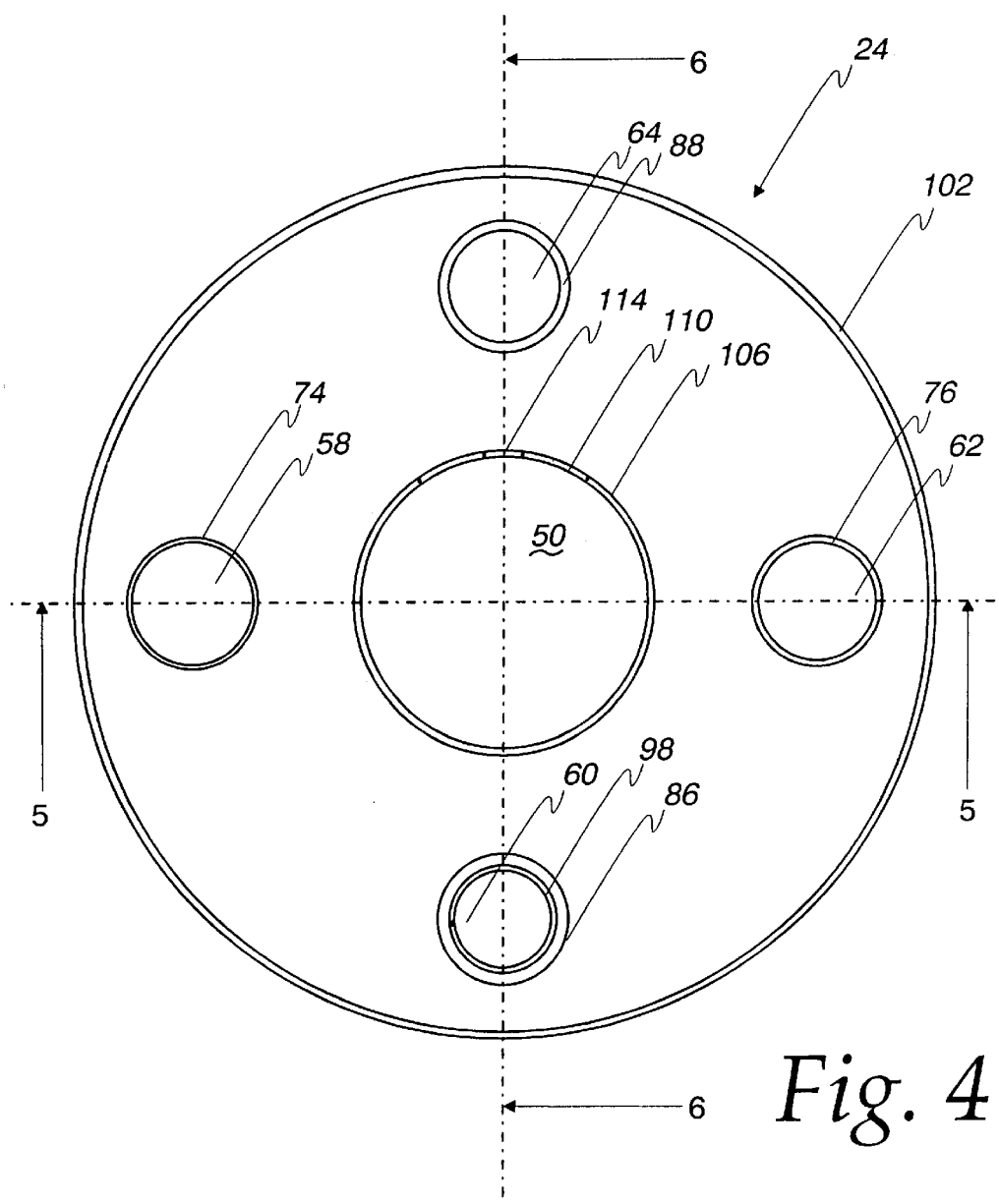
Fig. 4
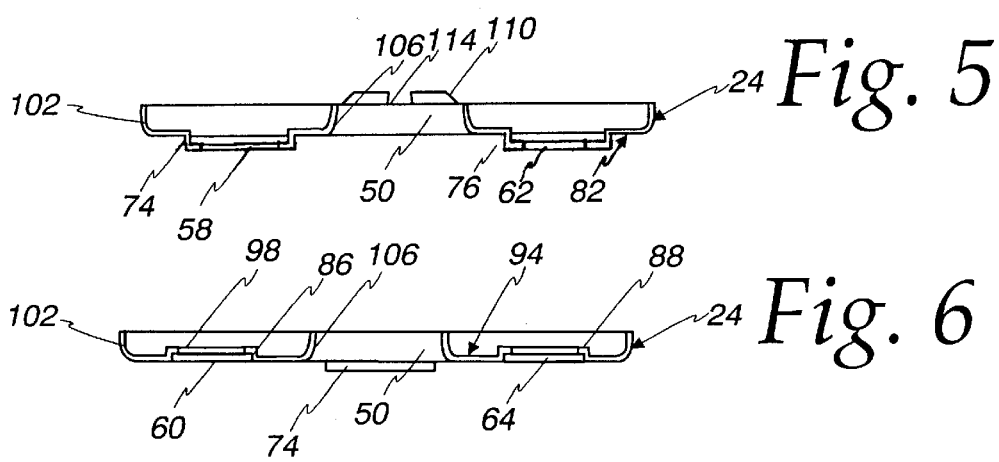
Fig. 5
Fig. 6

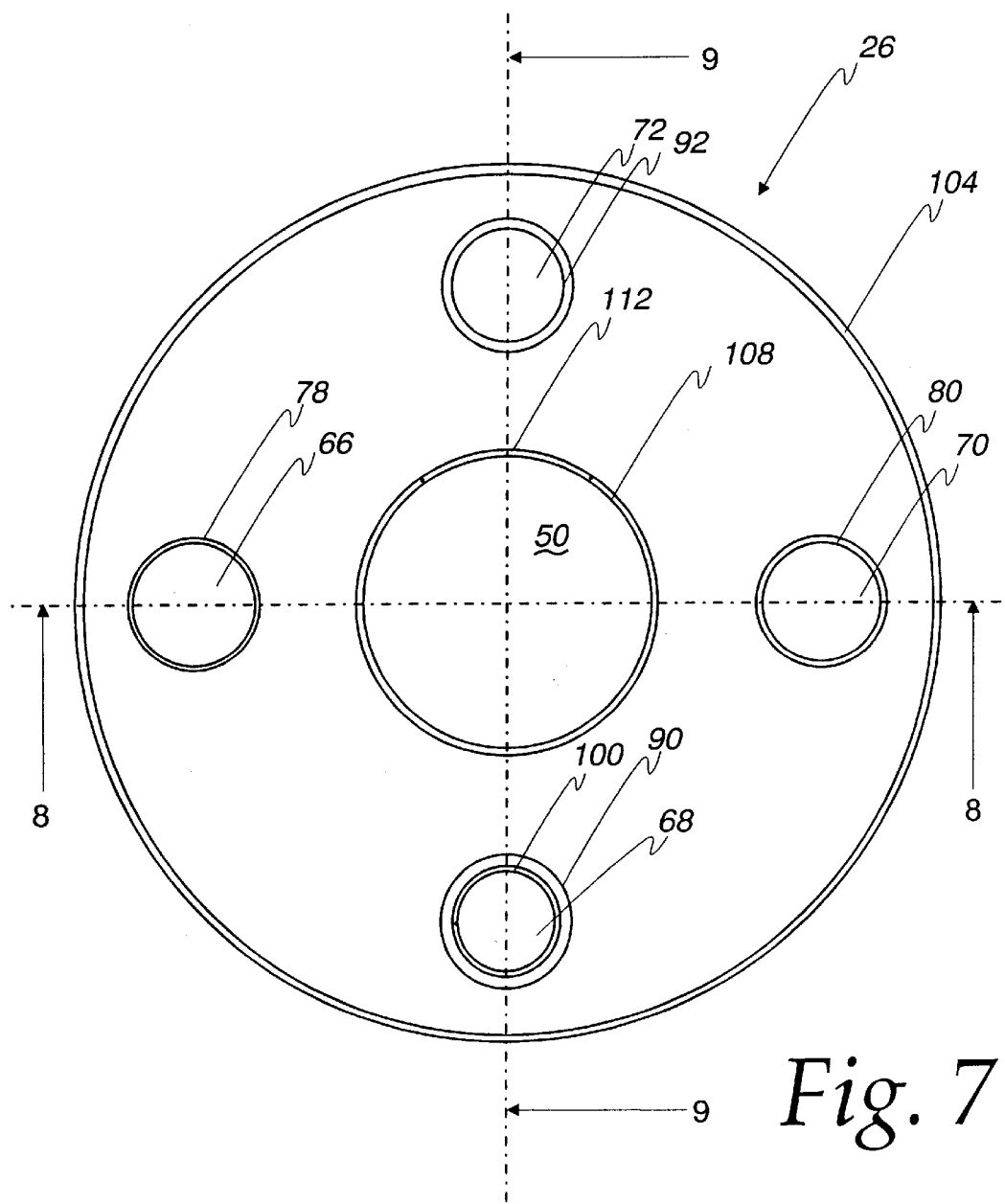
*Fig. 7*
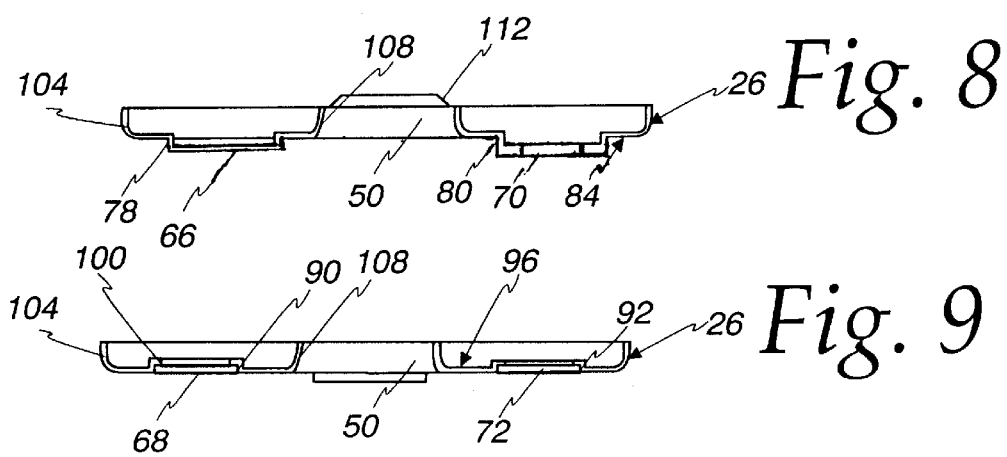
*Fig. 8*
*Fig. 9*

PLATE HEAT EXCHANGER WITH SERPENTINE FLOW PATHS

FIELD OF THE INVENTION

The present invention is directed to a plate heat exchanger, and in particular a plate heat exchanger with a serpentine fluid flow path.

BACKGROUND OF THE INVENTION

Housingless plate heat exchangers are known, for example, from German Laid-Open Application 41 25 222 A1 and U.S. Pat. No. 4,708,199, and are proposed therein as water-cooled oil coolers. U.S. Patent No. 4,708,199 shows several different connection variants and flow patterns through the oil cooler. A common feature of all variants is that the heat exchanger plates are arranged so that the passage openings in the heat exchanger plates form channels that pass through the stack of heat exchanger plates, through which a medium enters or leaves. On entry, the medium is distributed to the individual flow channels between the plates connected to the channels, in order to be collected at the output in the corresponding outlet channel before it leaves the heat exchanger. The flow channels between the plates alternate. A flow channel for oil, for example, is followed by a flow channel for water and so forth. The advantage of such a heat exchanger consists of its compact design, and that only two different types of heat exchanger plates are necessary.

However, for many applications, these heat exchangers have unduly low heat exchange performance, because the flow path through the heat exchanger is short. Moreover, the two types of heat exchanger plates have significant differences in shaping, which is a manufacturing drawback.

There is also a heat exchanger with a housing, in which a stack of two plates is arranged. In this heat exchanger one medium flows through the flow channels into the two plates, and the other medium flows into the housing and then through flow channels arranged between the two plates. It is known in such heat exchangers that the media can be made to flow in serpentine fashion through the heat exchanger by arranging baffles, or the like, in the flow channels. However, such heat exchangers are too costly to manufacture, are much more material-intensive and are therefore heavier than the heat exchangers of the aforementioned type at comparable performance.

SUMMARY OF THE INVENTION

According to an aspect of the present invention, a plate heat exchanger includes a plurality of spaced plates secured together to form a stack having a plurality of fluid flow channels and a first plurality of passages. The channels are divided into at least first and second groups, the channels in the first group spaced from one another by the channels in second group. Each passage in the first plurality of passages extends between adjacent plates through one of the channels in the second group of channels. Each successive passage in the first plurality of passages is in fluid communication with successive channels in the first group of channels, and is offset from each preceding passage in the first plurality of passages such that fluid flowing through the first group of channels and the first plurality of passages follows a serpentine pattern through the stack.

In a preferred embodiment, the plurality of spaced plates may include a second plurality of passages. Each passage in the second plurality of passages extends between adjacent plates through one of the channels in the first group of channels. Each successive passage in the second plurality of passages is in fluid communication with successive channels in the second group of channels and is offset from each preceding passage in the second plurality of passages such that fluid flowing through the second group of channels and the second plurality of passages follows a serpentine pattern through the stack.

In a further preferred embodiment, each plate may have a first nipple extending from the plate on a first side with an opening therethrough, and a second nipple extending from the plate on a second side with an opening therethrough. The first nipple of one of the plates abuts the second nipple of an adjacent plate with the openings aligned so as to define one of the passages of the first and second pluralities of passages. One of the first and second nipples of each plate may have a beveled end to be accepted within the opening of one of the first and second nipples of an adjacent plate.

In another preferred embodiment, each plate may have at least two nipples extending from the plate on a first side and at least two nipples extending from the plate on a second side. In at least one (possibly each) of the plates, all but one of the nipples have an opening therethrough. Also, each of the plates may have a marking tab, and the at least one of the plates has a marking tab different from the marking tabs of other plates.

In yet another preferred embodiment, the plate heat exchanger includes a first end plate and a second end plate. The first end plate is attached to a first end of the stack having an inlet in fluid communication with one of the first and second groups of channels and an outlet in fluid communication with the other of the first and second groups of channels. The second end plate is attached to a second end of the stack having an inlet in fluid communication with the other of the first and second groups of channels and an outlet in fluid communication with the one of the first and second groups of channels.

In still another preferred embodiment, each plate has a circular base plate with a hole through the center of the circular base, a central flange extending from a first side of the base plate about the periphery of the hole, and an external flange extending from the first side of the base plate about the periphery of the base plate. The central and external flanges of adjacent plates abut each other with the plates secured together to form the stack. The central and external flanges of adjacent plates are secured together to limit flow of fluid into and out of the first group of channels except through the first plurality of passages and into and out of the second group of channels except through the second plurality of passages.

BRIEF DESCRIPTION OF THE DRAWINGS

FIG. 4 is a top view of one of the heat exchanger plates of the heat exchanger of FIG. 1;

FIG. 5 is a cross-sectional view of the heat exchanger plate of FIG. 4 taken about line 5—5 in FIG. 4;

FIG. 6 is a cross-sectional view of the heat exchanger plate of FIG. 4 taken about line 6—6 in FIG. 4;

FIG. 7 is a top view of another of the heat exchanger plates of the heat exchanger of FIG. 1;

FIG. 8 is a cross-sectional view of the heat exchanger plate of FIG. 7 taken about line 8—8 in FIG. 7;

FIG. 9 is a cross-sectional view of the heat exchanger plate of FIG. 7 taken about line 9—9 in FIG. 7;

DETAILED DESCRIPTION OF THE PREFERRED EMBODIMENTS

Figure 1:
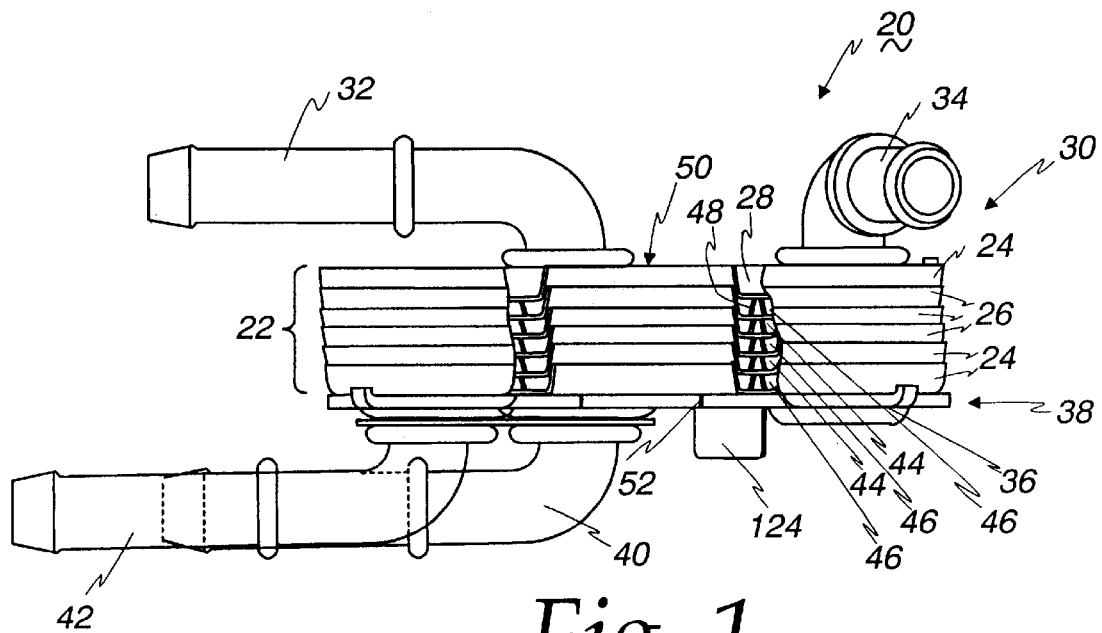
FIG. 1 is a side view of a heat exchanger according to the present invention, in partial cross-section.

An embodiment of a plate heat exchanger 20 according to the present invention is shown in FIG. 1. The exemplary plate heat exchanger 20 has a stack 22 of six heat exchanger plates 24, 26, but the number of plates 24, 26 in the stack 22 may vary. The number of heat exchanger plates 24, 26 in the stack 22 may vary, for example, on the degree of cooling required, or in dependance on other parameters, as is necessary.

Figure 2:
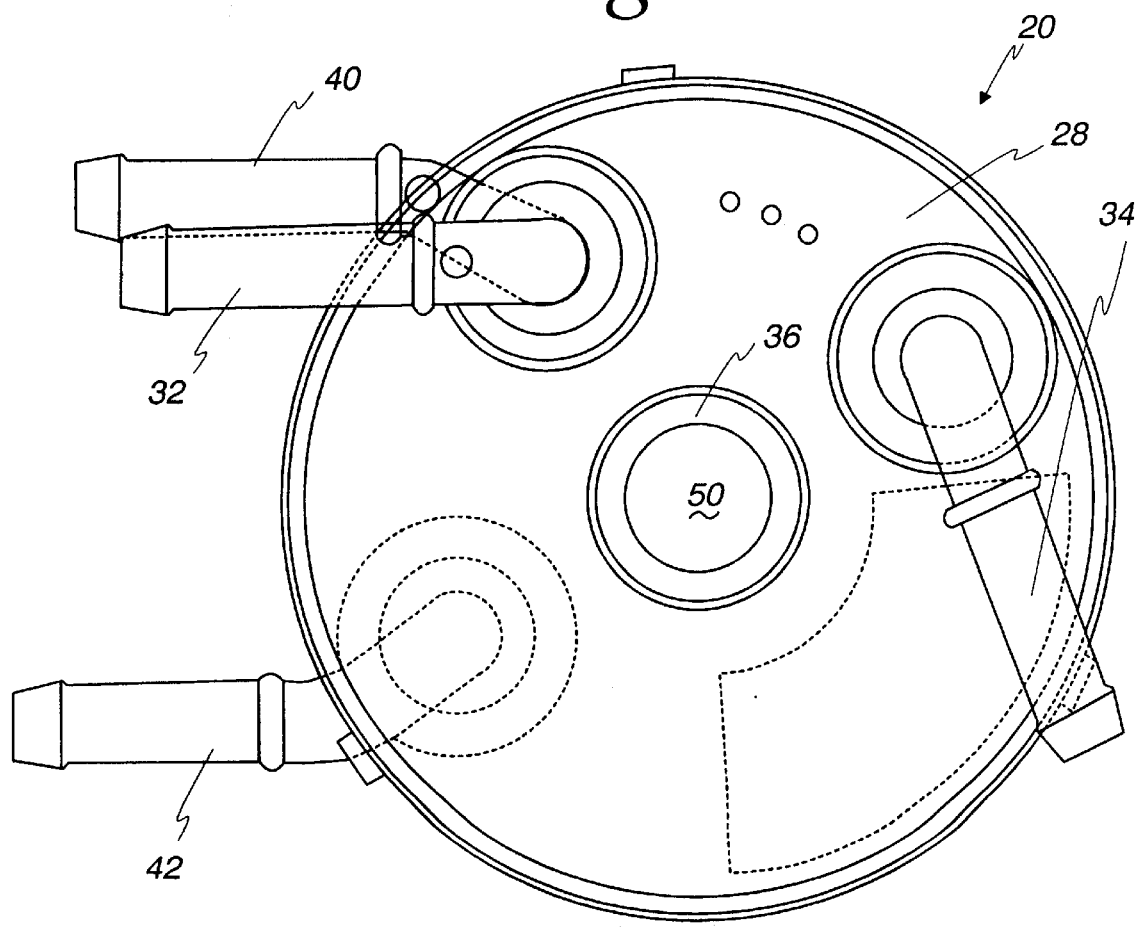
FIG. 2 is a top view of the heat exchanger of FIG. 1.

The plate heat exchanger 20 has a first end plate 28 (see FIG. 2) at a first end 30, with a first fluid inlet connector 32 and a second fluid outlet connector 34 attached thereto. The plate heat exchanger 20 also has a second (or base) plate 36 at a second end 38, with first fluid outlet connector 40 and a second fluid inlet connector 42 attached thereto. The first and second fluids flow in countercurrent through the plate heat exchanger 20. In particular, the plates 24, 26 are spaced so as to define channels 44, 46 therebetween, and the channels 44, 46 divided into two groups: the channels 44 for the first fluid and the channels 46 for the second fluid. The channels 44 of the first group are spaced by channels 46 of the second group disposed therebetween. Plates, baffles or turbulators 48, which serve to increase performance, may be situated in first and second flow channels 44, 46 between the heat exchanger plates 24, 26.

The heat exchanger 20 according to the invention may be used as a water-cooled fuel cooler wherein the first fluid is water and the second fluid is fuel, although other applications and uses are possible. The heat exchanger 20 is useful as a water-cooled fuel cooler because the very long flow paths available in a compact design space provide high cooling performance for the small amounts of fluid which pass through conventional fuel coolers. Moreover, because the fuel, especially in engines with direct injection, is circulated under high pressure in any case, the higher pressure loss (caused by the numerous flow bypasses) in the heat exchanger 20 as compared with conventional water-cooled fuel coolers is acceptable.

The plate heat exchanger 20 may be fabricated from aluminum sheet, and may be manufactured completely by means of a joining method, such as soldering or brazing, for example. The heat exchanger plates 24, 26, the first end plate 28, and the second end plate 36 have a central passage hole 50. A removable screw (not shown) is situated in the passage hole 50, the head of the screw disposed against a shoulder 52 of the plate 36. Additional details concerning the fastening of the plates 24, 26 can be found in German Patent No. 196 11 447 C1, which is incorporated herein in its entirety by reference. Simple and reliable fastening of the heat exchanger 20 may be thus obtained.

Figure 3:
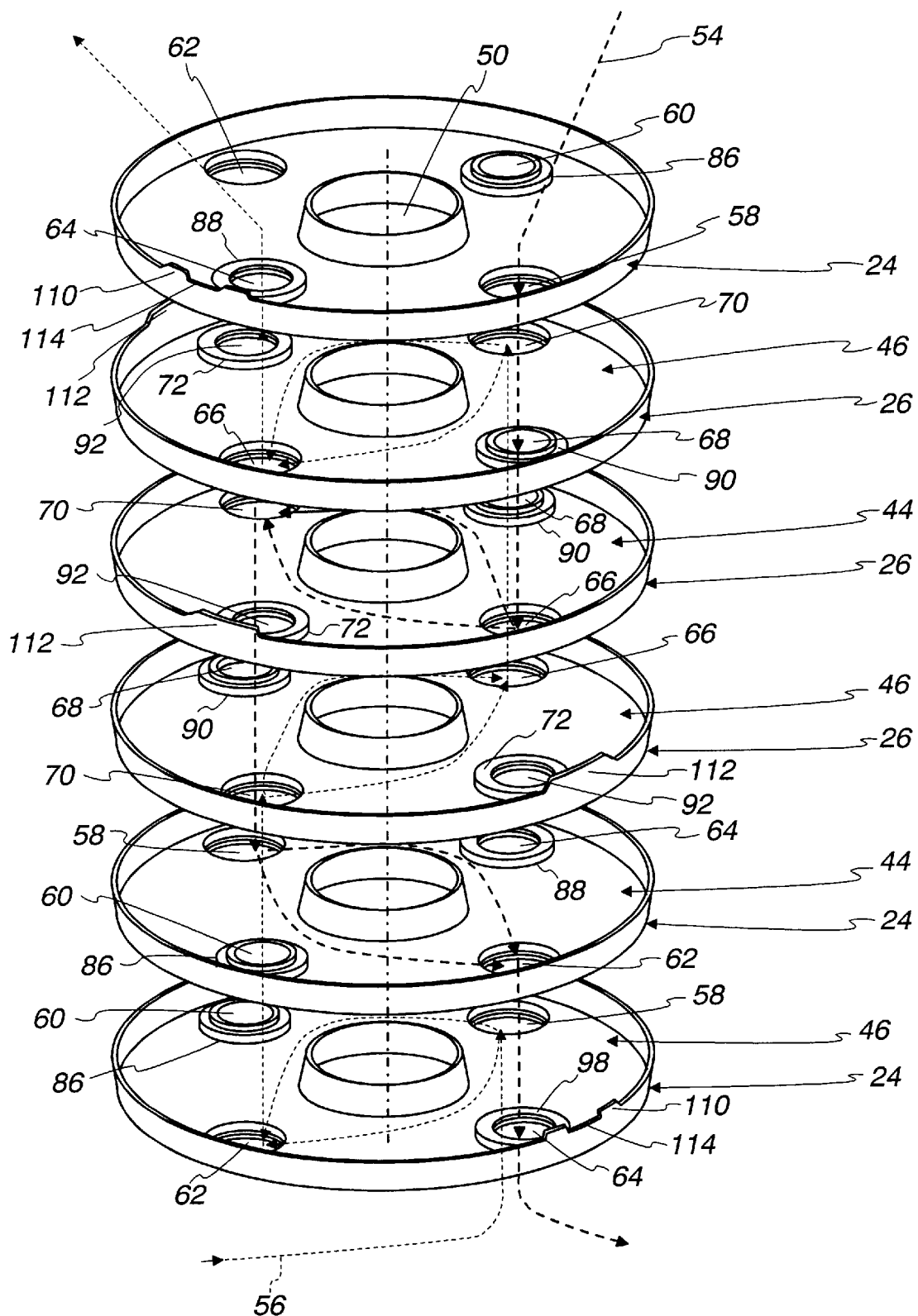
FIG. 3 is an exploded view of the heat exchanger of FIG. 1, with the inlet and outlet connectors removed for clarity.

Turning now to the exploded view of FIG. 3, the flow of the first and second fluids (water and fuel, respectively) is indicated between the plates 24, 26 through the channels 44, 46 by arrows 54, 56, the arrows 54 for water and the arrows 56 for fuel. It will be recognized from FIG. 3 that the propagation or flow of water and fuel in the flow channels 44, 46 intersects, i.e. it was as if an imaginary line drawn between the input and the output of the flow channel 44 (representing the flow of the water) crosses a similar imaginary line drawn between the input and output of the adjacent flow channel 46 (representing the flow of the fuel). It will also be recognized that the water flowing between successive channels 44 and the fuel flowing between successive channels 46 follows a zig-zag or serpentine flow path through the plate heat exchanger 20. The zig-zag or serpentine flow path provides a longer flow path than is provided conventionally, thereby promoting the heat exchange between the two fluids in the heat exchanger 20 without sacrificing the compactness of the heat exchanger 20. This improves the overall performance of the heat exchanger 20.

The heat exchanger plates 24, 26 according to the present invention are now discussed in greater detail with respect to FIGS. 4–9. The plate heat exchanger 20 has three heat exchanger plates 24 (FIGS. 4–6) with four media openings 58, 60, 62, 64, all of which are open. The plate heat exchanger 20 also has three heat exchanger plates 26 (FIGS. 7–9) with four media openings 66, 68, 70, 72, the media opening 66 in each being closed.

While the openings 60, 62 are shown as closed in the lowermost and uppermost heat exchanger plates 24 in FIG. 3, the openings 60, 62 are not manufactured closed, but are covered or occluded by the end plates 28, 36 (not shown in FIG. 3), which are rigidly connected to the stack 22 of heat exchanger plates 24, 26 as shown in FIG. 1. The necessity for having the end plates 28, 36 to occlude the openings 60, 62 is a consequence of using three heat exchanger plates 24 and three heat exchanger plates 26. However, equal numbers of plates 24, 26 are used because it may be advantageous to produce the plates using double dies, i.e. two dies arranged in a single guide frame such that in one stroke one heat exchanger plate 24 and one heat exchanger plate 26 are produced. The costs for preliminary work can be significantly reduced through the use of this manufacturing process.

It will be recognized from FIGS. 5, 6 and 7, 8, that the openings 58, 62 of the plates 24 and 66, 70 of the plates 26 are formed in nipples 74, 76 and 78, 80 on one side 82, 84 of the plates 24, 26 (FIGS. 5 and 8), and that the openings 60, 64 and 68, 72 are formed in nipples 86, 88 and 90, 92 on a second side 94, 96 of the plates 24, 26. The nipples 74, 76, 78, 80, 86, 88, 90, 92 mesh with or abut each other during stacking of the heat exchanger plates 24, 26, and thus form an appropriate soldering location.

One of the nipples 74, 76, 78, 80, 86, 88, 90, 92 from each of the plates 24, 26 has a beveled end 98, 100, for example the nipple 86 of the plate 24 and the nipple 90 of the plate 26. The beveled ends 98, 100 have an effective diameter which is smaller than that of the openings 58, 62, 70 through which they may be disposed when the plates 24, 26 are assembled into the stack 22. With the beveled ends 98, 100 disposed through the openings 58, 62, 70 of the adjacent heat exchanger plates 24, 26, the individual plates 24, 26 of the entire stack 22 are secured against rotation, as is more readily apparent with reference to FIG. 3.

In other words, the stacked individual heat exchanger plates 24, 26 as prepared for soldering can be secured in the relative positions assigned to them. It will be recognized that rotation of the heat exchanger plates 24, 26 relative to each other could cause serious quality problems, possibly rendering the product useless. Through the use of the beveled ends 98, 100, relative rotation of the plates 24, 26 is reliably prevented.

Additionally, each heat exchanger plate 24, 26 may have an external flange 102, 104, and a central flange 106, 108 around the central passage hole 50. The external and central flanges 102, 104, 106, 108 form a soldering surface during stacking of plates 24, 26 with the external and central flanges 102, 104, 106, 108 of the adjacent heat exchanger plates 24, 26.

Moreover, a marking projection 110, 112 may be provided on the external flanges 102, 104 of the plates 24, 26. For distinction, the marking projection 110 has a cutout 114. This cutout 114 indicates that the heat exchanger plate 24 has all four flow openings 58, 60, 62, 64 open. The marking projection 110 is helpful when the stacking of the heat exchanger plates 24, 26 is done by hand, in order to permit a control of proper stacking. During use of automatic equipment, the projection 110 can be omitted. If production of the heat exchanger plates 24, 26 is to be carried out with a combination die, then the cutting punch for flow opening 66 and for cutout 114 may be omitted for plates 26.

Figure 10:
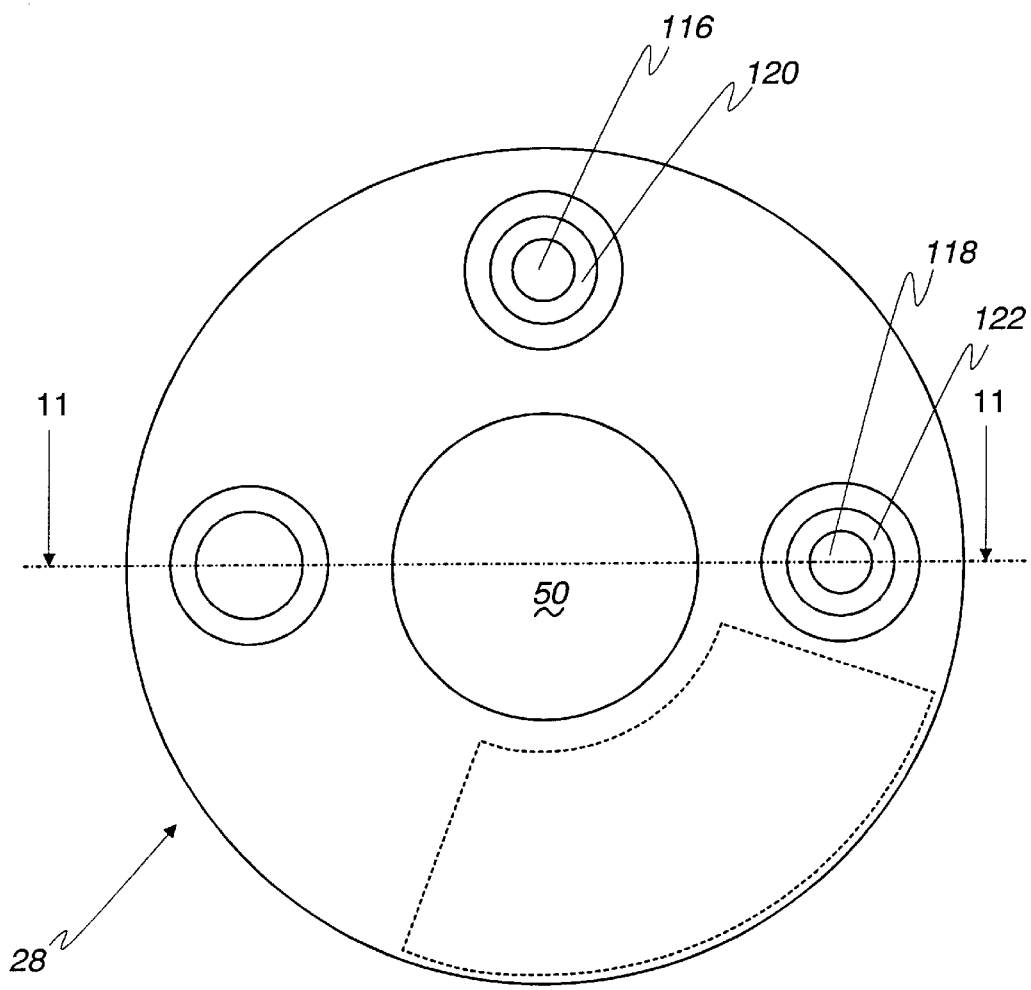
FIG. 10 is a top view of one of the end plates of the heat exchanger of FIG. 1.
Figure 11:
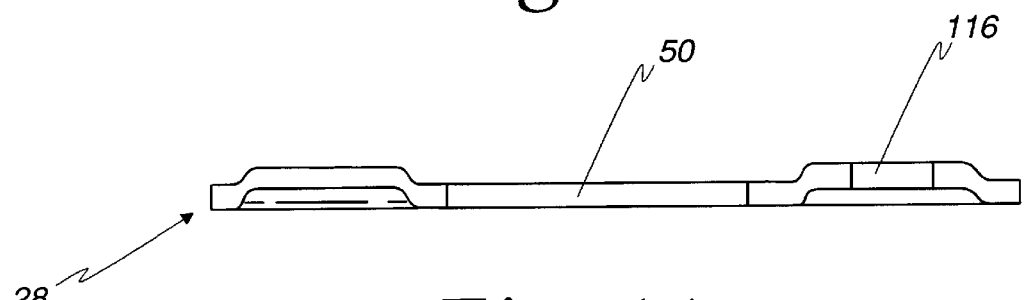
FIG. 11 is a cross-sectional view of the end plate of FIG. 10 taken about line 11—11 in FIG. 10.

FIGS. 10–11 show the end plate 28 belonging to the plate heat exchanger 20. The end plate 28 is the upper cover plate of the plate heat exchanger 20. The central hole 50 is larger than the hole 50 in the other end plate 36 described shortly below. In addition, the end plate 28 has two additional holes 116, 118. The water inlet connector 32 is attached to the end plate 28 in fluid communication with the hole 116, while the fuel outlet connector 34 is attached to the end plate 28 in fluid communication with the hole 118. The holes 116, 118 are situated in the center of circular hubs 120, 122, provided to improve the solder connection of connectors 32, 34, but the hubs 120, 122 are primarily required to guarantee that one of the nipples 86, 88 can be accommodated so that smooth support of the end plate 28 on the uppermost heat exchanger plate 24 is ensured.

Figure 12:
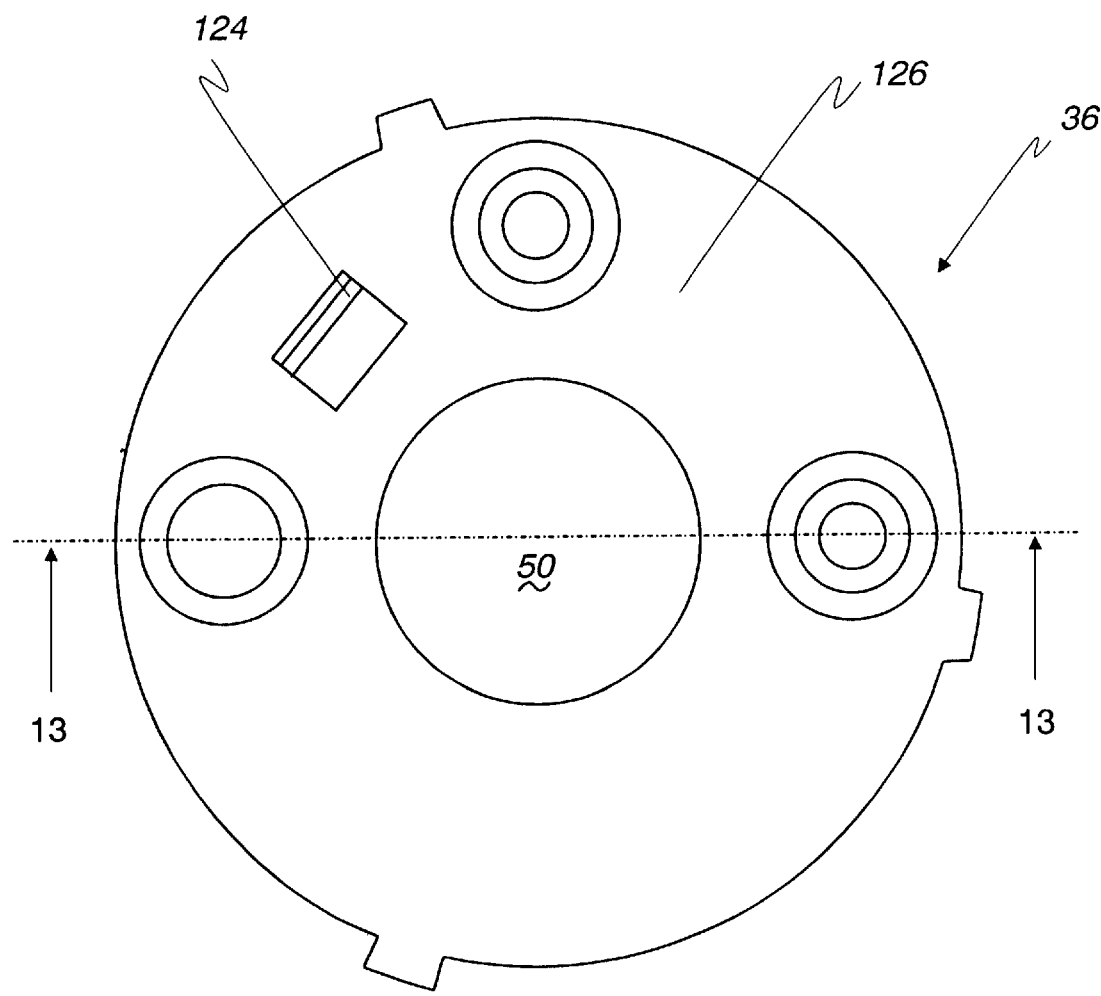
FIG. 12 is a bottom view of the other end plate of the heat exchanger of FIG. 1.
Figure 13:
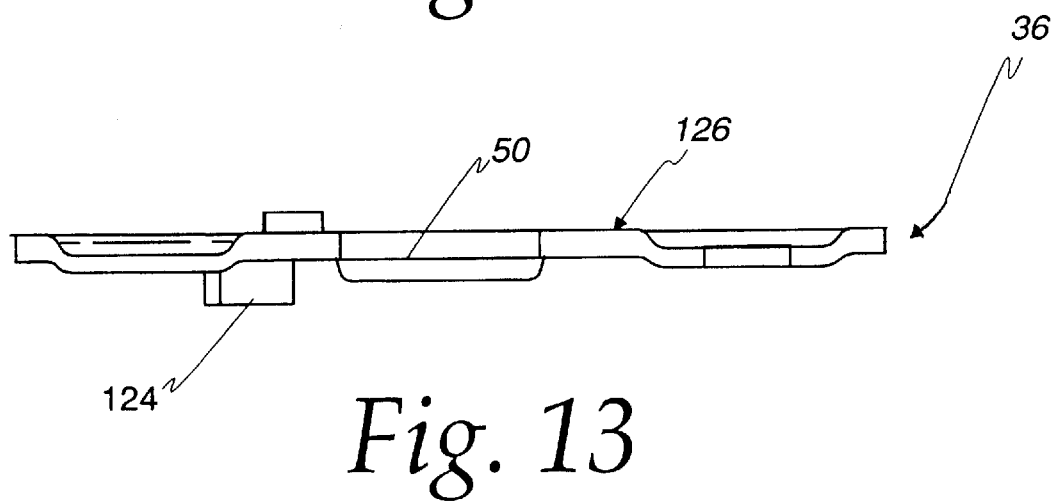
FIG. 13 is a cross-sectional view of the end plate of FIG. 12 taken about line 13—13 in FIG. 12.

The other end plate 36 depicted in FIGS. 12–13 differs from the end plate 28 in that, as already mentioned, the central hole 50 is smaller, and by the fact that a section 124 is partially cut out and bent from the flat surface 126 of base plate 36. The bent section 124 serves as an aid in attaching the plate heat exchanger 20 to a frame, to prevent rotation of the plate heat exchanger 20 around the central fastening point.

Figure 14:
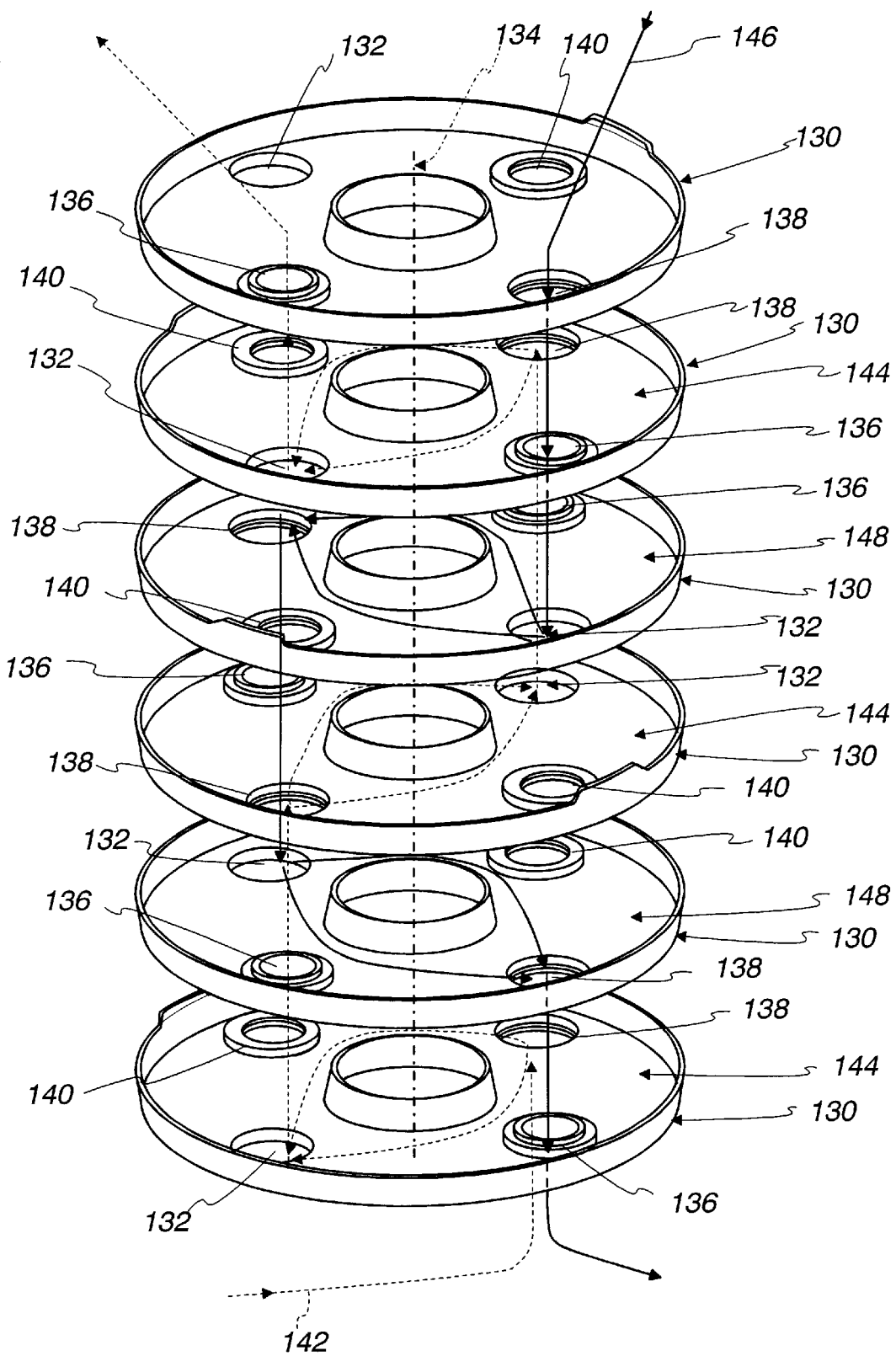
FIG. 14 is an exploded view of an alternative arrangement of heat exchanger plates in a heat exchanger according to the present invention.

Another embodiment of a heat exchanger 128 according to the present invention is shown in FIG. 14. Identical heat exchanger plates 130 are used, each having a closed flow opening 132. The heat exchanger plates 130 are each rotated by 90° around a vertical axis 134, such that the closed flow openings 132 are offset relative to each other. In this manner, an imaginary connection line runs between the closed flow openings 132, but also between the other identical flow openings 136, 138, 140 in spiral fashion in the direction of the vertical axis 134 around heat exchanger 130.

In this fashion, the plate heat exchanger 128, with any number of identical heat exchanger plates 130, may be assembled. Naturally, the closed flow opening 132 can also be freely chosen when the inlets and/or outlets for water and fuel are desired at other flow openings than those shown in FIG. 14. It is only important that the same flow opening 132 is closed in all heat exchanger plates 130.

In FIG. 14 the fuel flows (as shown by arrows 142) into a lowermost flow channel 144, upward over the closed opening 132, into the next flow channel 144, upward over another closed opening 132, and, via the connected flow openings 136, 138, into an uppermost flow channel 144. The water flows (as shown by arrows 146) from the top via the connected flow openings 136, 138 into an uppermost flow channel 148. The water there encounters the closed flow opening 132, flows to the opposite side and, via the connected flow openings 136, 138, into the next flow channel 148. The water then encounters another closed flow opening 132 of one of the plates 130, flows through flow opening 136 in the lowermost heat exchanger plate 130, and into the next flow path (not shown).

Still other aspects, objects and advantages of the present invention can be obtained from a study of the specification, the drawings, and the appended claims.

We claim:

1. A plate heat exchanger comprising:
    a plurality of spaced plates secured together to form a stack having a plurality of fluid flow channels and a first plurality of passages,
    the channels being divided into at least first and second groups, the channels in the first group spaced from one another by the channels in second group,
    each passage in the first plurality of passages extending between adjacent plates through one of the channels in the second group of channels,
    each successive passage in the first plurality of passages in fluid communication with successive channels in the first group of channels and being offset from each preceding passage in the first plurality of passages such that fluid flowing through the first group of channels and the first plurality of passages follows a serpentine pattern through the stack.

2. The plate heat exchanger according to claim 1, wherein the plurality of spaced plates further comprises a second plurality of passages,
    each passage in the second plurality of passages extending between adjacent plates through one of the channels in the first group of channels,
    each successive passage in the second plurality of passages in fluid communication with successive channels in the second group of channels and being offset from each preceding passage in the second plurality of passages such that fluid flowing through the second group of channels and the second plurality of passages follows a serpentine pattern through the stack.

3. The plate heat exchanger according to claim 2, wherein each plate has a first nipple extending from the plate on a first side and having an opening therethrough and a second nipple extending from the plate on a second side and having an opening therethrough,
    the first nipple of one of the plates abutting the second nipple of an adjacent plate with the openings aligned so as to define one of the passages of the first and second pluralities of passages.

4. The plate heat exchanger according to claim 3, wherein one of the first and second nipples of each plate has a beveled end to be accepted within the opening of one of the first and second nipples of an adjacent plate.

5. The plate heat exchanger according to claim 2, wherein each plate has at least two nipples extending from the plate on a first side and at least two nipples extending from the plate on a second side, and in at least one of the plates all but one of the nipples have an opening therethrough.

6. The plate heat exchanger according to claim 5, wherein each of the plates has a marking tab, and the at least one of the plates has a marking tab different from the marking tabs of other plates.

7. The plate heat exchanger according to claim 5, wherein in each of the plates all but one of the nipples have an opening therethrough.

8. The plate heat exchanger according to claim 5, wherein one of the nipples with an opening therethrough has a beveled end to be accepted within the opening in one of the nipples of an adjacent plate.

9. The plate heat exchanger according to claim 1, further comprising:
- a first end plate attached to a first end of the stack having an inlet in fluid communication with one of the first and second groups of channels and an outlet in fluid communication with the other of the first and second groups of channels; and
- a second end plate attached to a second end of the stack having an inlet in fluid communication with the other of the first and second groups of channels and an outlet in fluid communication with the one of the first and second groups of channels.

10. The heat exchanger according to claim 2, wherein each plate comprises a circular base plate with a hole through the center of the circular base, a central flange extending from a first side of the base plate about the periphery of the hole, and an external flange extending from the first side of the base plate about the periphery of the base plate, the central and external flanges of adjacent plates abutting each other with the plates secured together to form the stack, the central and external flanges of adjacent plates secured together to limit flow of fluid into and out of the first group of channels except through the first plurality of passages and into and out of the second group of channels except through the second plurality of passages.

* * * * *